(12) United States Patent
Harty et al.

(10) Patent No.: US 11,396,245 B2
(45) Date of Patent: Jul. 26, 2022

(54) HYBRID VEHICLE-TO-GRID AND MOBILITY SERVICE REQUEST SYSTEM

(71) Applicant: Honda Motor Co., Ltd., Tokyo (JP)

(72) Inventors: Ryan Douglas Roy Harty, Long Beach, CA (US); Jeremy Whaling, Carson, CA (US); Robert Uyeki, Torrance, CA (US); Sruthi Raju Nadimpalli, Long Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 443 days.

(21) Appl. No.: 16/673,131

(22) Filed: Nov. 4, 2019

(65) Prior Publication Data

US 2020/0276910 A1 Sep. 3, 2020

Related U.S. Application Data

(60) Provisional application No. 62/811,717, filed on Feb. 28, 2019.

(51) Int. Cl.
*B60L 55/00* (2019.01)
*G06Q 50/30* (2012.01)
(Continued)

(52) U.S. Cl.
CPC .............. *B60L 55/00* (2019.02); *B60L 53/63* (2019.02); *B60L 53/665* (2019.02); *G06Q 50/30* (2013.01); *B60L 2240/60* (2013.01)

(58) Field of Classification Search
CPC ........ B60L 55/00; B60L 53/665; B60L 53/63; B60L 2240/60; G06Q 50/30
(Continued)

(56) References Cited

U.S. PATENT DOCUMENTS 9,606,539 B1 3/2017 Kentley et al.
2007/0282495 A1 12/2007 Kempton et al.
(Continued)

OTHER PUBLICATIONS

X. Cheng, X. Hu, L. Yang, I. Husain, K. Inoue, K. Inoue, P. Krein, R. Lefevre, Y. Li, H. Nishi, J.G. Taiber, F-Y. Wang, Y. Zha, W. Gao and Z. Li, "Electrified Vehicles and the Smart Grid: The ITS perspective," IEEE Transactions on Intelligent Transportation Systems, vol. 15, No. 4, Aug. 4, 2014, pp. 1388-1404. https:www.researchgate.net/profile/Xiaoya_Hu/publication/264387368_Electrified_vehicles_and_the_Smart_Grid_The_ITS_Perspectivelinks/56f0b21908ae584badc9393c.pdf.
(Continued)

*Primary Examiner* — Gertrude Arthur Jeanglaude
(74) *Attorney, Agent, or Firm* — Rankin, Hill & Clark LLP

(57) ABSTRACT

According to one aspect, a hybrid vehicle-to-grid and mobility service request system includes a receiving module, a transport module, a charging module, and a grant module. The receiving module receives a transport request and a vehicle-to-grid (V2G) request. The transport request is associated with transport from an origin to a destination using a vehicle. The V2G energy request is associated with providing charge from the vehicle to source equipment at a charging location. The transport module determines a first numerical value associated with remuneration for the transport. The charging module determines a second numerical value associated with remuneration for providing the charge. The grant module compares the first numerical value associated with the transport request to the second numerical value associated with the V2G energy request. The grant module grants the transport request or the V2G energy request based on the comparison.

20 Claims, 8 Drawing Sheets

(51) Int. Cl.
  *B60L 53/63*       (2019.01)
  *B60L 53/66*       (2019.01)
(58) Field of Classification Search
  USPC .......................................................... 701/22
  See application file for complete search history.

(56) References Cited

U.S. PATENT DOCUMENTS

| | | |
|---|---|---|
| 2010/0017045 A1 | 1/2010 | Nesler et al. |
| 2011/0130885 A1 | 6/2011 | Bowen et al. |
| 2011/0276194 A1 | 11/2011 | Emalfarb et al. |
| 2014/0351010 A1 | 11/2014 | Kong |
| 2016/0209220 A1 | 7/2016 | Laetz |
| 2016/0247106 A1 | 8/2016 | Dalloro et al. |
| 2017/0005515 A1 | 1/2017 | Sanders et al. |
| 2017/0176195 A1* | 6/2017 | Rajagopalan ...... G01C 21/3415 |
| 2019/0308510 A1* | 10/2019 | Beaurepaire ........ B60L 15/2045 |
| 2019/0325757 A1* | 10/2019 | Goel .................... G08G 5/0026 |

OTHER PUBLICATIONS

J. Hu, S. You, M. Lind and J. Ostergaard, "Coordinated Charging of Electric Vehicles for Congestion Prevention in the Distribution Grid," IEEE Transactions on Smart Grid, 5(2), 703-711, 2014. https://orbit.dtu.dk/files/63780956/ieee_early_access_paper.pdf.

* cited by examiner

HYBRID VEHICLE-TO-GRID AND MOBILITY SERVICE REQUEST SYSTEM

BACKGROUND

An electric vehicle (EV) may use energy stored in rechargeable onboard batteries to power one or more electric motors that provide propulsion of the EV. Depending on the manner (e.g., frequency, distance) in which the EV is operated, unused energy in the batteries may be inefficient. For example, accounting for unused energy may require larger batteries, which may in turn increase the total cost of ownership (TCO) of the EV.

SUMMARY

According to one aspect, a hybrid vehicle-to-grid and mobility service request system includes a receiving module, a transport module, a charging module, and a grant module. The receiving module receives a transport request and a vehicle-to-grid (V2G) request. The transport request is associated with transport from an origin to a destination using a vehicle. The V2G energy request is associated with providing charge from the vehicle to a source equipment at a charging location. The transport module determines a first numerical value associated with remuneration for the transport. The charging module determines a second numerical value associated with remuneration for providing the charge. The grant module compares the first numerical value associated with the transport request to the second numerical value associated with the V2G energy request. The grant module grants the transport request or the V2G energy request based on the comparison.

According to another aspect, a computer-implemented method includes receiving a transport request associated with transport to a destination using a vehicle. The method further includes determining a first numerical value associated with remuneration for the transport. The method also includes receiving a V2G energy request associated with providing charge from the vehicle to a source equipment to a charging location. The method includes determining a second numerical value associated with remuneration for providing the charge. The method further includes comparing a first numerical value associated with the transport request to a second numerical value associated with the V2G energy request. The method also includes granting the transport request or the V2G energy request based on the comparison.

According to a further aspect, a non-transitory computer-readable storage medium including instructions that when executed by a processor, cause the processor to perform a method. The method includes receiving a transport request associated with transport to a destination using a vehicle. The method further includes determining a first numerical value associated with remuneration for the transport. The method also includes receiving a V2G energy request associated with providing charge from the vehicle to a source equipment to a charging location. The method includes determining a second numerical value associated with remuneration for providing the charge. The method further includes comparing a first numerical value associated with the transport request to a second numerical value associated with the V2G energy request. The method also includes granting the transport request or the V2G energy request based on the comparison.

DRAWINGS

Embodiments of the present disclosure will be illustrated by way of example in the drawings and explained in the description below.

DESCRIPTION

Figure 1:
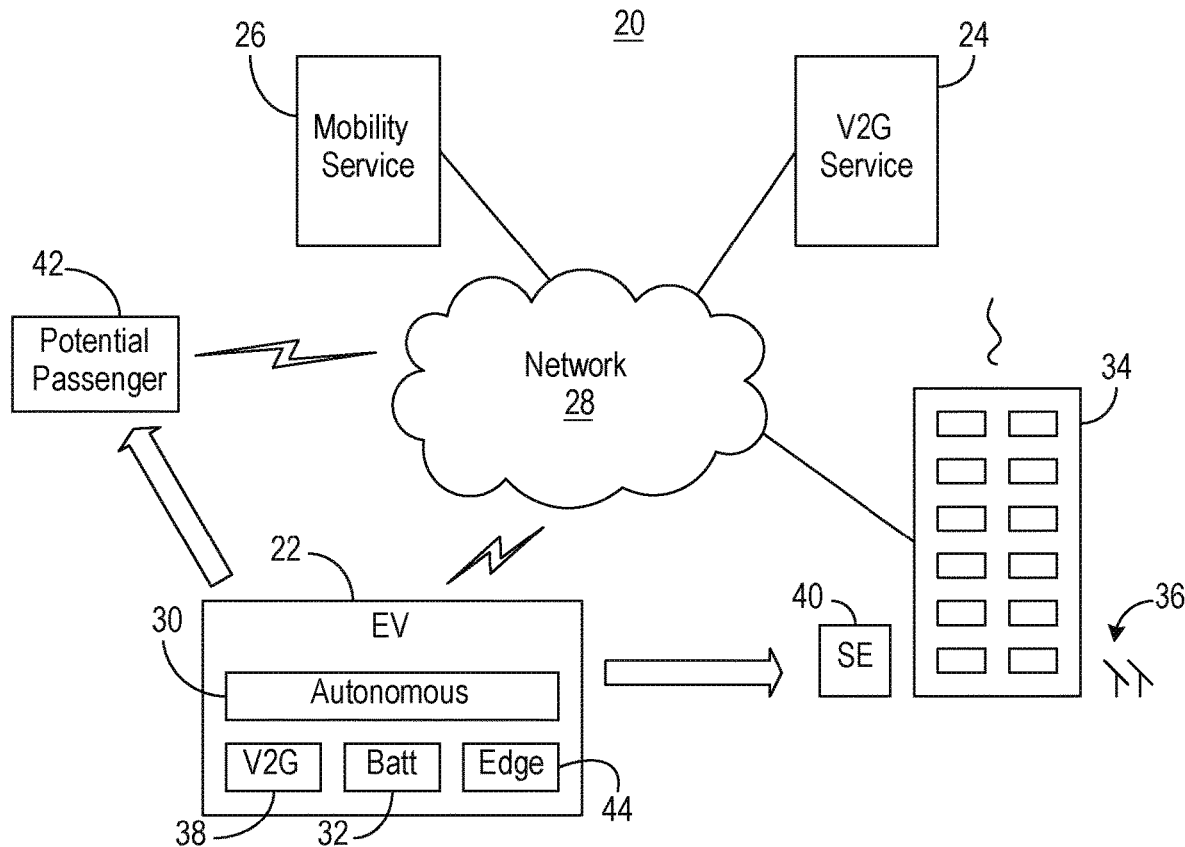
FIG. 1 illustrates a block diagram of an example of a vehicle-to-grid (V2G) and mobility service architecture according to an embodiment of the present disclosure.

While the concepts of the present disclosure are susceptible to various modifications and alternative forms, specific embodiments have been shown by way of example in the drawings and will be described herein in detail. It should be understood, however, that there is no intent to limit the scope of the present disclosure to the particular forms disclosed, but on the contrary, the intention is to cover all modifications, equivalents, and alternatives consistent with the present disclosure and the appended claims.

References in the specification to "one embodiment," "an embodiment," "embodiments," "an illustrative embodiment," etc., indicate that the embodiment(s) described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

Definitions

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, instructions for execution, and a computer. A computer component(s) can reside within a process and/or thread. A computer component can be localized on one computer and/or can be distributed between multiple computers.

"Computer communication," as used herein, refers to a communication between two or more computing devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, vehicle to cloud communications, among others. Computer communication can utilize any type of wired, wireless, or network communication protocol including, but not limited to, Ethernet (e.g., IEEE 802.3), Wi-Fi (e.g., IEEE 802.11), communications access for land mobiles (CALM), WiMAX, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

"Potential passenger," as used herein include inanimate objects and/or biological beings to be transported from an origin to a destination.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

"Vehicle occupant," as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

System Overview

Systems and method for hybrid vehicle-to-grid and mobility service requests are provided herein. Turning now to FIG. 1, an architecture 20 is shown in which an electric vehicle (EV) 22 uses edge network interface circuitry 44 to communicate with a vehicle-to-grid (V2G) service 24 (e.g., centralized server, distributed server, cloud computing infrastructure, etc., or any combination thereof) and a mobility service 26 (e.g., centralized server, distributed server, cloud computing infrastructure, etc., or any combination thereof) over a network 28 (e.g., base stations, routers, switches, access points, web servers, etc., or any combination thereof). The illustrated EV 22, which might be a car, truck, motorcycle, van, bus, etc., includes an autonomous subsystem 30 that enables driverless or driver-assisted operation of the EV 22. Thus, the autonomous subsystem 30 may include various components such as, for example, navigation, Global Positioning System (GPS), radar, camera, artificial intelligence (e.g., neural networks), steering, drive train, electric motors and/or other components. Alternatively, the EV 22 may be manually operated by an individual (e.g., user, not shown). The illustrated EV 22 also includes a battery 32, which is rechargeable, to power electric motors that provide propulsion of the EV 22. Although one battery is shown, the EV 22 may include multiple batteries, depending on the circumstances.

In one example, the EV 22 is part of a fleet of vehicles that provide unused energy stored in the battery 32 to facilities such as, for example, a building 34 (e.g., owned, operated and/or occupied by a business, governmental entity or other organization) that experiences a gap (e.g., shortage) between renewable energy collected by a source such as, for example, a solar panel array 36 and the energy demand of the building 34. Accordingly, the EV 22 may include a V2G subsystem 38 that enables unused energy stored in the battery 32 to be transferred (e.g., discharged) to the building 34 via source equipment (SE) 40 installed at the location of the building 34. In this regard, when gaps/shortages are encountered or expected, the building 34 (or associated system) may issue V2G energy requests to the EV 22 via the V2G service 24. The EV 22 may selectively grant the V2G energy requests in exchange for compensation, credits, cryptocurrency, stock, and so forth. The EV 22 may also detect the energy gaps/shortages based on available usage data (e.g., "Green Button" data) and initiate the V2G energy requests in response to the detected energy gaps/shortages.

The EV 22 may also be part of a fleet of vehicles that provide on demand transportation services (e.g., UBER, LYFT) to individuals such as, for example, a potential passenger 42. Accordingly, the potential passenger 42 may use a client device (not shown) to issue a transport request to the EV 22 via the mobility service 26, where the transport request indicates a pick-up location that is different from the discharge location of the SE 40. The EV 22 may selectively grant the transportation request in exchange for compensation, credits, cryptocurrency, stock, and so forth.

As will be discussed in greater detail, if the transport request from the potential passenger 42 and a V2G energy request from the building 34 are associated with overlapping service periods, the EV 22 may automatically determine whether to grant the transport request or the V2G energy request. Accordingly, the illustrated EV 22 may optimize efficiency and decrease the total cost of ownership (TCO) of the EV 22 by determining whether it is more beneficial to the owner of the EV 22 to transport the potential passenger 42 or discharge energy to the building 34. Indeed, the illustrated solution may enable the size of the battery 32 to be significantly reduced because the amount of unused energy in the battery 32 is minimized. The automated selection between requests may be performed by the edge network interface circuitry 44 or other computing system (not shown) internal to and/or external to the EV 22. Additionally, the EV 22 may be the personal transportation of an individual rather than part of a fleet.

Figure 2:
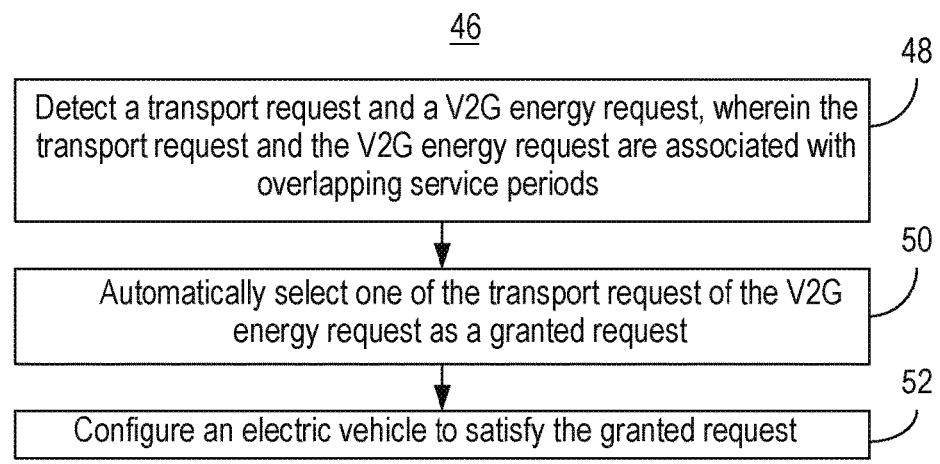
FIG. 2 illustrates a flowchart of an example of a method of operating a hybrid V2G and mobility computing system according to an embodiment of the present disclosure.

FIG. 2 shows a method 46 of operating a hybrid mobility and V2G computing system. The method 46 may generally be implemented by a computing system and/or electric vehicle such as, for example, the EV 22 (FIG. 1), already discussed. More particularly, the method 46 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 46 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 48 provides for detecting a transport request and a V2G energy request, wherein the transport request and the V2G energy request are associated with overlapping service periods (e.g., concurrent/simultaneous demands). Block 50 may automatically select one of the transport request or the V2G energy request as a granted request. As will be discussed in greater detail, block 50 may take into consideration various parameters/attributes of the requests such as, for example, service location, numerical values (e.g., kWh, distance, price per kWh, price per mile, credits, cryptocurrency, etc.) associated with the requests, and so forth. An electric vehicle may be automatically configured to satisfy the granted request at block 52. Block 52 may include, for example, dispatching the EV to a pick-up location associated with the transport request, dispatching the EV to a discharge location associated with the V2G request, scheduling future dispatches, programming autonomous navigation routes, and so forth.

Figure 3:
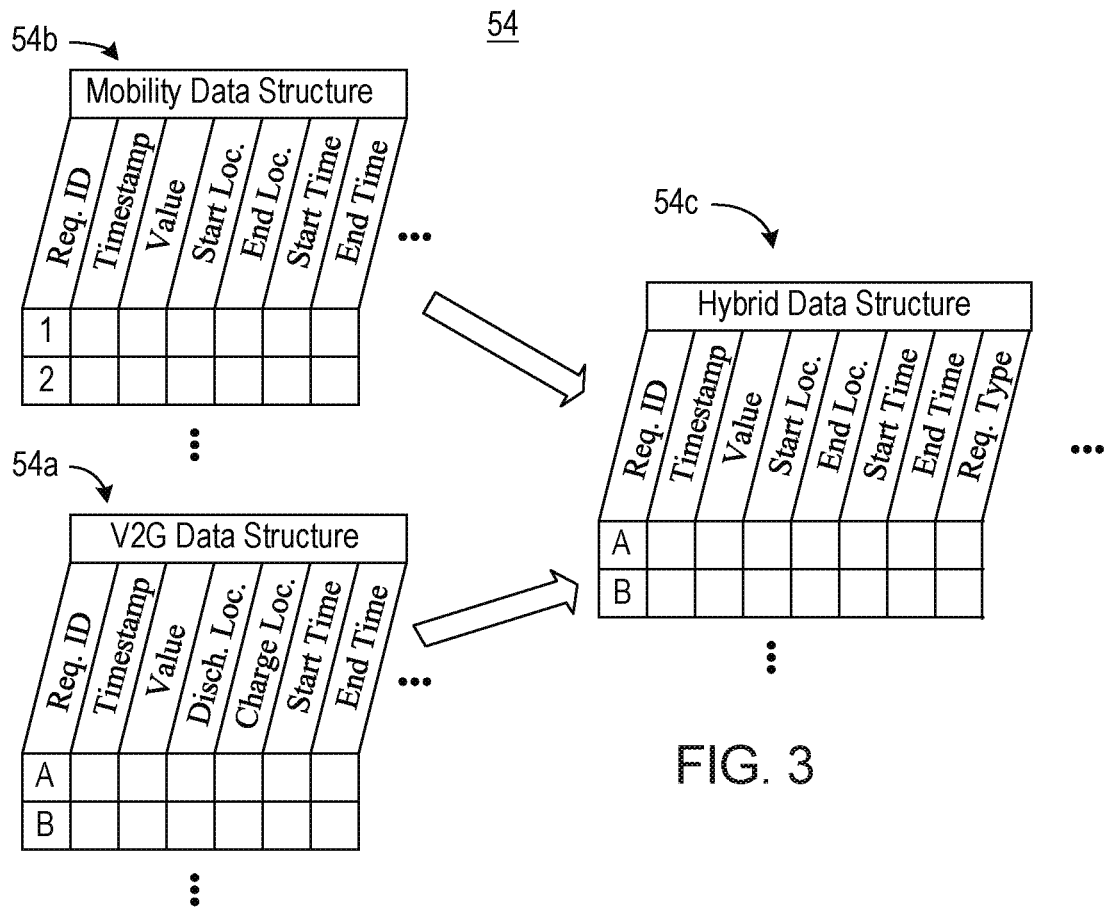
FIG. 3 illustrates a diagram of an example of a set of data structures according to an embodiment of the present disclosure.

FIG. 3 shows a set of data structures 54 (54a-54c) that may generally be used to facilitate the hybrid delivery of V2G and mobility services via an EV. More particularly, a V2G data structure 54a (e.g., relational database, table, list) may contain a plurality of V2G energy requests, where the V2G data structure 54a might be maintained on a system such as the V2G service 24 (FIG. 1), already discussed. The V2G data structure 54a documents various request attributes such as, for example, request identifier (ID), timestamp (e.g., time when the request was issued or received), numerical value (e.g., kWh, price per kWh, credits, cryptocurrency, etc.), discharge location, charge location, start time, end time, and so forth. As will be discussed in greater detail, the numerical value of a V2G energy request may be generated by an entity in need of unused energy and/or adjusted/set by the EV, depending on the circumstances.

Similarly, a mobility data structure 54b (e.g., relational database, table, list) may contain a plurality of transport requests, where the mobility data structure 54b might be maintained on a system such as the mobility service 26 (FIG. 1), already discussed. The illustrated mobility data structure 54b documents various request attributes such as, for example, request ID, timestamp, numerical value (e.g., kWh, distance, price per mile, credits, cryptocurrency, etc.), start location, end location, start time, end time, and so forth. As will be discussed in greater detail, the value of a transport request may be generated by one or more individuals in need of transportation and/or adjusted/set (e.g., increased) by the EV.

Because the V2G data structure 54a and the mobility data structure 54b may be maintained on different platforms, systems and/or networks (e.g., by different entities), application programming interface (API) technology may be used to detect and/or obtain the V2G energy requests and the transport requests. An API may generally be a set of defined methods of communication between various software components. Thus, the EV might use a first API to access the mobility data structure 54b and use a second API to access the V2G data structure 54a, where the information from the mobility data structures 54a, 54b is used to populate a hybrid data structure 54c. Accordingly, a seamless system of providing mobility and V2G energy services from an EV may be achieved across different platforms.

Figure 4A:
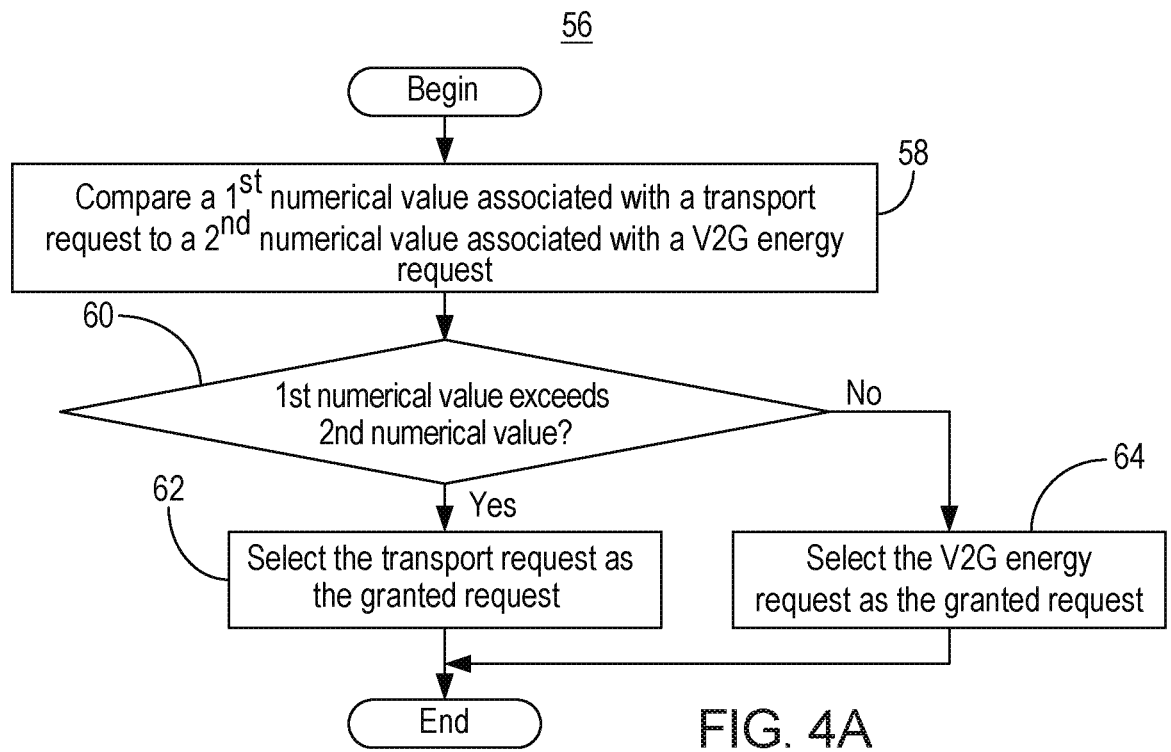
FIGS. 4A and 4B illustrate flowcharts of examples of methods of automatically selecting a granted request according to embodiments of the present disclosure.

FIG. 4A shows a method 56 of automatically selecting a granted request in a hybrid system. The method 56 may readily be substituted for block 50 (FIG. 2), already discussed. More particularly, the method 56 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Block 58 provides for comparing a first numerical value associated with a transport request to a second numerical value associated with V2G energy request. For example, if the transport request is for trip that will cost the potential passenger X credits (e.g., in a standardized exchange system) and the V2G energy request is for an amount of energy that will cost the requesting entity Y credits, block 58 might compare X to Y to determine which numerical value is higher. Alternatively, block 58 may compare the amount of time involved in satisfying the requests. For example, if the trip is expected to take twenty minutes (e.g., given projected traffic) and the energy transfer is expected to take fifteen minutes (e.g., given a projected charge rate), block 58 might compare the numerical value of twenty to the numerical value of fifteen. In yet another example, block 58 may compare the amount of charge (e.g., kWh) involved in satisfying the requests. The comparison may also use other numerical values and/or involve conversions. Additionally, block 58 may determine whether the EV has the resources (e.g., unused energy, time) to satisfy the requests.

If it is determined at block 60 that the first numerical value (e.g., transport request value) exceeds the second numerical value (e.g., V2G energy request value), illustrated block 62 selects the transport request as the granted request. Otherwise, block 64 may select the V2G energy request as the granted request. Thus, the illustrated method 56 favors the request having the highest numerical value (e.g., most credits, most time, most kWh, etc.). Other selection criteria (e.g., lowest numerical value) may also be used, depending on the type of value being compared.

Figure 4B:
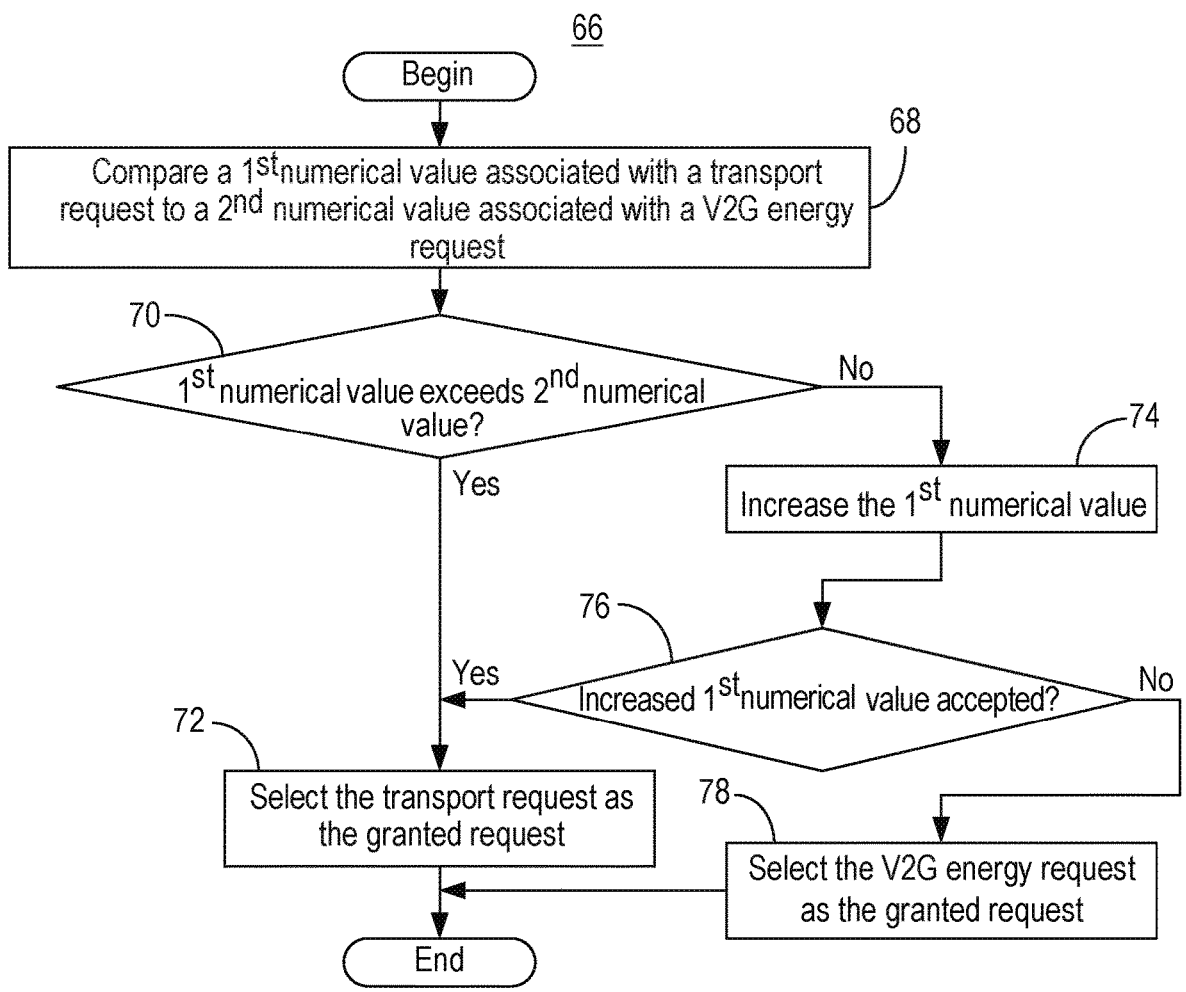

FIG. 4B shows another method 66 of automatically selecting a granted request in a hybrid system. The method 66 may readily be substituted for block 50 (FIG. 2), already discussed. More particularly, the method 66 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Block 68 provides for comparing a first numerical value associated with a transport request to a second numerical value associated with V2G energy request. For example, if the transport request is for a trip that will cost the potential passenger 100 Euros and the V2G energy request is for an amount of energy that will cost the requesting entity 150 Euros, block 58 might compare 100 Euros to 150 Euros to determine which numerical value is higher. Alternatively, block 58 might compare the travel distance involved in satisfying the requests. For example, if the trip is calculated to be 30 kilometers and the distance to the energy discharge location is calculated to be 5 kilometers, block 58 might compare the numerical value of 30 kilometers to the numerical value of 5 kilometers. As already noted, the comparison may also use other numerical values and/or involve conversions and block 68 may determine whether the EV has the resources (e.g., unused energy, time) to satisfy the requests.

If it is determined at block 70 that the first numerical value (e.g., transport request value) exceeds the second numerical value (e.g., V2G energy request value), block 72 selects the transport request as the granted request. Otherwise, block 74 increases the first numerical value. For example, if the transport request is for a trip that will cost the potential passenger 100 Euros and the V2G energy request is for an amount of energy that will cost the requesting entity 150 Euros, block 74 might increase the first numerical value to 200 Euros (i.e., a level higher than the second numerical value). Block 74 may also communicate the increased first numerical value to the potential passenger (e.g., via the mobility service, text message, instant message/IM, etc.), where if it is determined at block 76 that the increased first numerical value has been accepted, block 72 may provide for selecting the transport request as the granted request in response to the acceptance. If it is determined at block 76 that the increased first numerical value has not been accepted, the V2G energy request may be selected at block 78 as the granted request.

Figure 5:
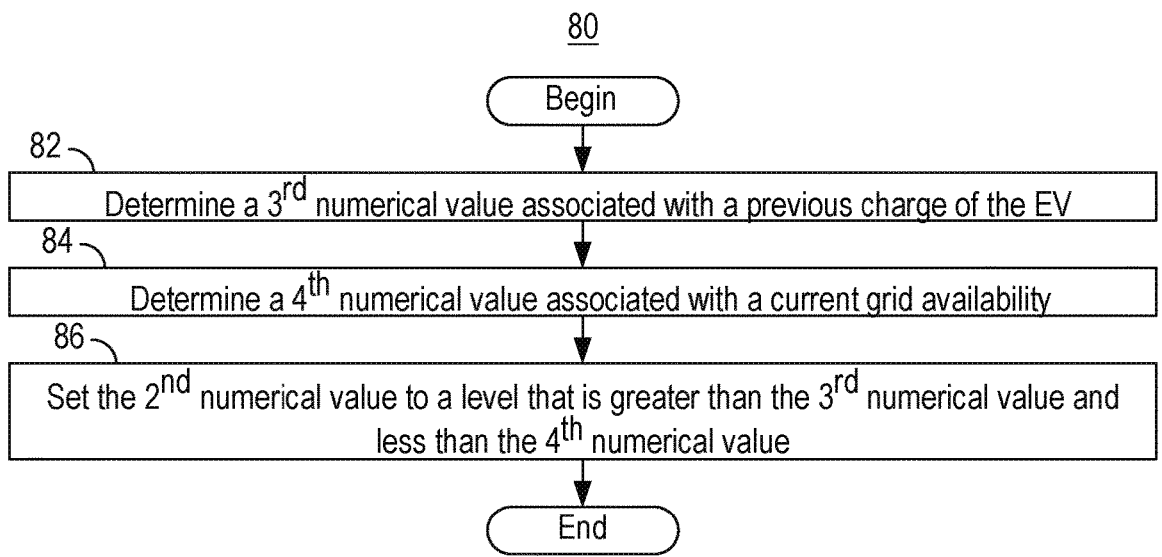
FIG. 5 illustrates a flowchart of an example of a method of determining a numerical value associated with a V2G energy request according to an embodiment of the present disclosure.

FIG. 5 shows a more advanced method 80 of determining a numerical value associated with a V2G energy request. The method 80 may generally be implemented by a computing system and/or electric vehicle such as, for example, the EV 22 (FIG. 1), already discussed. More particularly, the method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Figure 6:
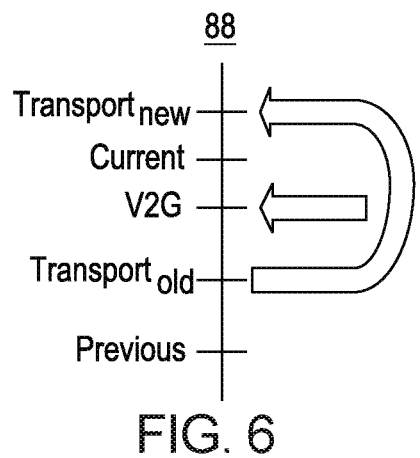
FIG. 6 illustrates a diagram of an example of a set of numerical values according to an embodiment of the present disclosure.

Green Button data (e.g., electricity, natural gas and/or water usage information) of a facility may be used by an EV to detect an energy gap/shortage and trigger an offer of V2G energy to the facility. With continuing reference to FIGS. 5 and 6, a scale 88 demonstrates that processing block 82 may determine a third numerical value ("Previous," e.g., price per kWh) associated with a previous charge of an EV, where block 84 may determine a fourth numerical value ("Current," e.g., price per kWh) associated with a current grid availability of energy at the requesting location. The second numerical value ("V2G") associated with the V2G energy request may be set at block 86 to a level that is greater than the third ("Previous") numerical value and less than the fourth ("Current") numerical value to ensure that the energy transfer is beneficial to both the EV owner and the energy requestor. If accepted by the facility, the V2G energy offer from the EV may balance the energy shortage (e.g., close the energy gap) of the facility without the facility initiating a V2G energy request. The scale 88 also demonstrates that the first numerical value ("Transport$_{old}$") may be increased to a higher first numerical value ("Transport$_{new}$") as already discussed with regard to block 74 (FIG. 4B).

Figure 7:
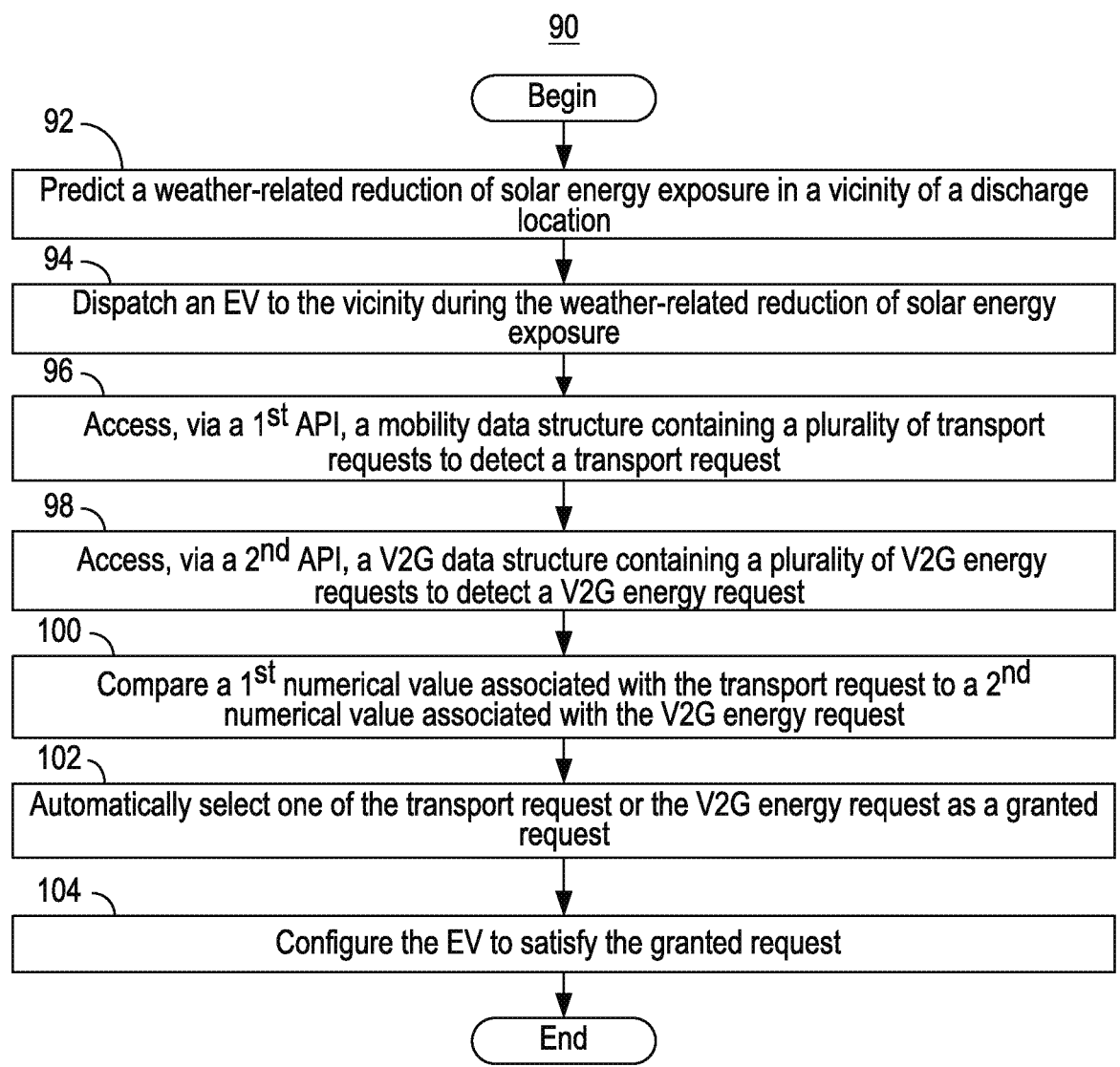
FIG. 7 illustrates a flowchart of an example of a more detailed method of operating a hybrid V2G and mobility computing system according to an embodiment of the present disclosure.

FIG. 7 shows a more detailed method 90 of operating a hybrid V2G and mobility computing system. The method 90 may generally be implemented by a computing system and/or electric vehicle such as, for example, the EV 22 (FIG. 1), already discussed. More particularly, the method 90 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Block 92 provides for predicting a weather-related reduction of solar energy exposure in a vicinity of a discharge location such as, for example, the location of the SE 40 (FIG. 1), already discussed. The weather-related reduction of solar energy exposure might be associated with cloudy and/or rainy weather conditions. Accordingly, block 92 may include accessing a weather forecast database to determine the expected weather conditions of the location at the time period in question. Of particular note is that the reduced solar energy exposure may be an indicator of an expected increase of V2G energy requests in the vicinity in question. In this regard, an EV is dispatched to the vicinity at illustrated block 94 during the weather-related reduction of solar energy exposure. Dispatching the EV to the vicinity of the reduced solar energy exposure may enable the EV to more quickly service V2G energy requests from facilities experiencing a gap/shortage between collected renewable energy and energy demand.

Block 96 may access, via a first API, a mobility data structure containing a plurality of transport requests to detect a transport request. In one example, the mobility data structure is similar to the mobility data structure 54b (FIG. 3), already discussed. Additionally, illustrated block 98 accesses, via a second API, a V2G data structure containing a plurality of V2G energy requests to detect a V2G energy request. In one example, the V2G data structure is similar to the V2G data structure 54a (FIG. 3), already discussed. A first numerical value associated with the transport request may be compared at block 100 to a second numerical value associated with the V2G energy request. Block 102 may provide for automatically selecting one of the transport request or the V2G request as a granted request. In one example, the selection of block 102 is made at least partly on the comparison of block 100. Illustrated block 104 configures the EV to satisfy the granted request. Accordingly, if the EV is already in the vicinity of the originator of the V2G energy request and the pick-up location of the transport request is relatively far away, block 102 might select the V2G energy request as the granted request because the amount of energy used before beginning the V2G delivery service would be lower (e.g., particularly if the cost of energy in the two locations is similar).

Figure 8:
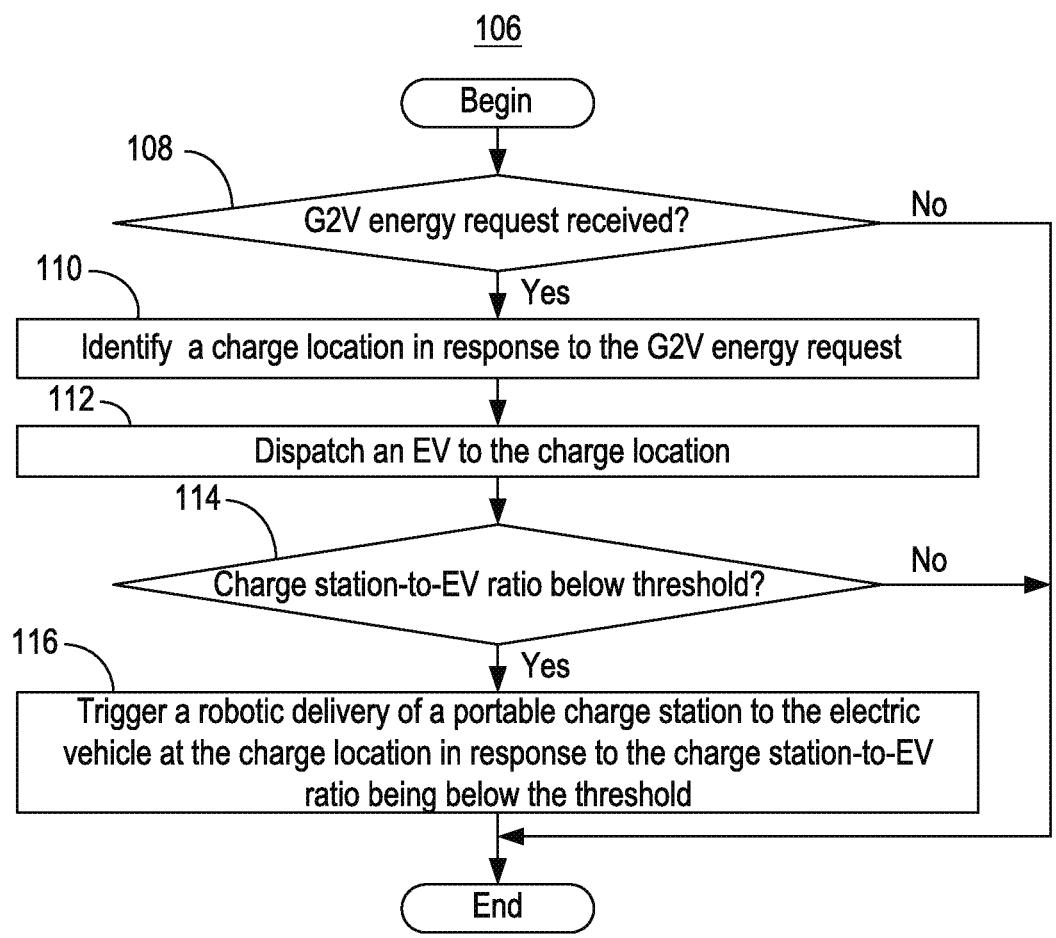
FIG. 8 illustrates a flowchart of an example of a method of charging an EV according to an embodiment of a present disclosure.

FIG. 8 shows a method 106 of charging an EV. The method 106 may generally be implemented by a computing system and/or electric vehicle such as, for example, the EV 22 (FIG. 1), already discussed. More particularly, the method 106 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 108 determines whether a grid-to-vehicle (G2V) energy request has been received. The G2V energy request might be received from a battery state monitor of an electric vehicle such as the EV 22 (FIG. 1), already discussed. If a G2V energy request is detected, block 110 may identify a charge location in response to the G2V energy request. Block 110 may include searching an onboard or remote data structure containing available charging locations. The EV may be dispatched to the charge location at block 112.

Of particular note is that, as the quantity of EVs increases, the charge station-to-EV may be an issue of concern to facilities having closed (e.g., secure) campuses that would not permit an autonomous EV to leave the premises in search of an available charge station. Accordingly, block 114 may determine whether the charge-station-to-EV ratio associated with the charge location is below a threshold (e.g., 1.0). If so, there may be a shortage of charge stations. Illustrated block 116 solves this challenge by automatically triggering a robotic delivery of a portable charge station to the EV at the charge location in response to the charge station-to-EV ratio being below the threshold. For example, a robot might be equipped with AI, cameras and/or other sensors to detect the charge port on the EV to connect a charging cable of the portable charge station to the charge port. Thus, a user might drive the EV to a designated parking space at work, get out and enter the facility, with the EV automatically traveling to the charge location while the user is working. Once the robotic charge is complete (e.g., based on state of charge/SOC and/or departure requirements), the EV might drive to a different parking space and text the location of the parking space to the user. The method 106 may also enable facilities to monetize their charging stations during non-work hours (e.g., weekends, holidays and/or evenings).

Figure 9:
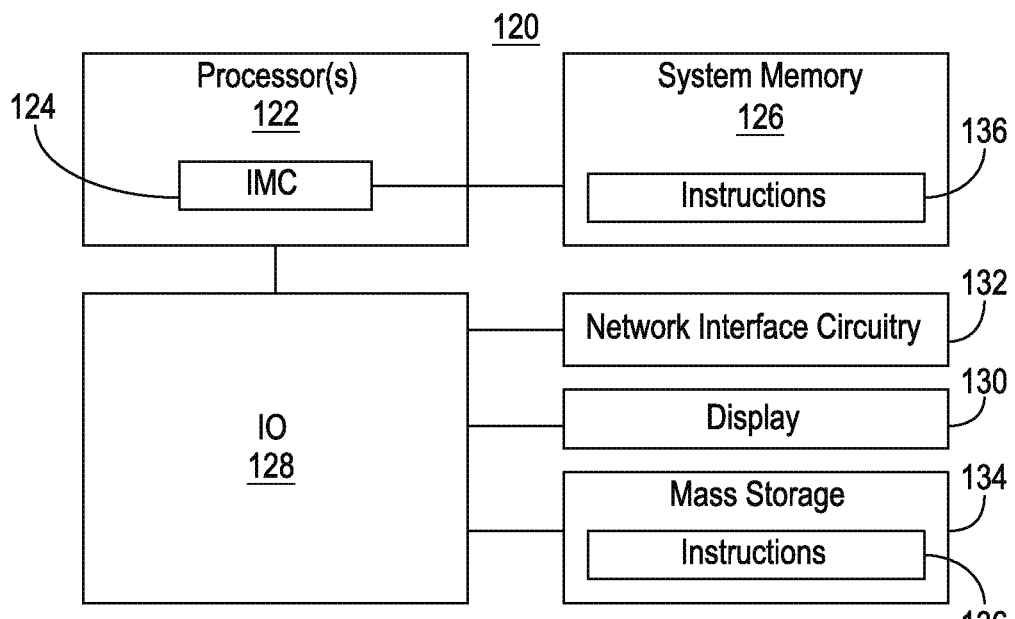
FIG. 9 illustrates a block diagram of an example of a computing system according to an embodiment of the present disclosure.

Turning now to FIG. 9, a computing system 120 is shown. The system 120 may be incorporated into an electric vehicle such as, for example, the EV 22 (FIG. 1) or located external to the electric vehicle. In the illustrated example, the system 120 includes one or more processor(s) 122 (e.g., host processor(s), central processing unit(s)/CPU(s)) having an integrated memory controller (IMC) 124 that is coupled to a system memory 126.

The illustrated system 120 also includes an input output (IO) module 128 implemented together with the processor(s) 122 on a semiconductor die (not shown) as a system on chip (SoC), wherein the IO module 128 functions as a host device and may communicate with, for example, a display 130 (e.g., touch screen, liquid crystal display/LCD, light emitting diode/LED display), network interface circuitry 132 (e.g., wired and/or wireless), and mass storage 134 (e.g., hard disk drive/HDD, optical disk, solid state drive/SSD, flash memory). The processor(s) 122 may execute instructions 136 retrieved from the system memory 126 and/or the mass storage 134 to perform one or more aspects of the method 46 (FIG. 2), the method 56 (FIG. 4A), the method 66 (FIG. 4B), the method 80 (FIG. 5) and/or the method 106 (FIG. 8).

Thus, execution of the instructions 136 may cause the system 120 to detect a transport request and a V2G energy request, wherein the transport request and the V2G energy request are associated with overlapping service periods, automatically select one of the transport request or the V2G energy request as a granted request, and configure an EV to satisfy the request.

Figure 10:
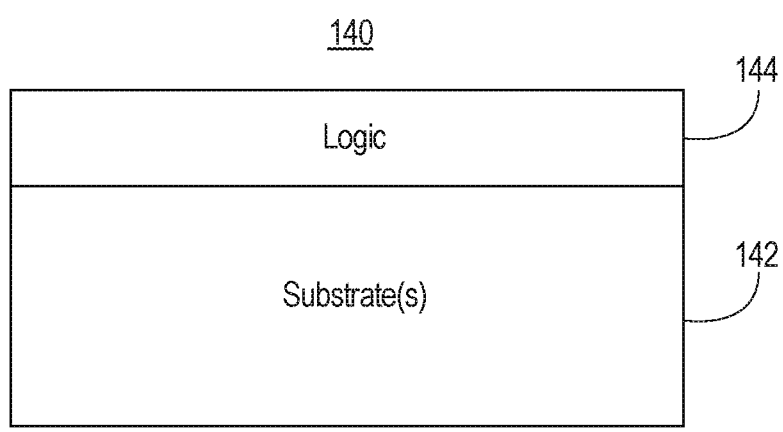
FIG. 10 illustrates a diagram of an example of a semiconductor package apparatus according to an embodiment of the present disclosure.

FIG. 10 shows a semiconductor package apparatus 140 (e.g., chip, die) that includes one or more substrate(s) 142 (e.g., silicon, sapphire, gallium arsenide) and logic 144 (e.g., transistor array and other integrated circuit/IC components) coupled to the substrate(s) 142. The logic 144, which may be implemented at least partly in configurable logic and/or fixed-functionality hardware logic, may generally implement one or more aspects of the method 46 (FIG. 2), the method 56 (FIG. 4A), the method 66 (FIG. 4B), the method 80 (FIG. 5) and/or the method 106 (FIG. 8). Thus, the logic 144 may detect a transport request and a V2G energy request, wherein the transport request and the V2G energy request are associated with overlapping service periods, automatically select one of the transport request or the V2G energy request as a granted request, and configure an EV to satisfy the request.

Figure 11:
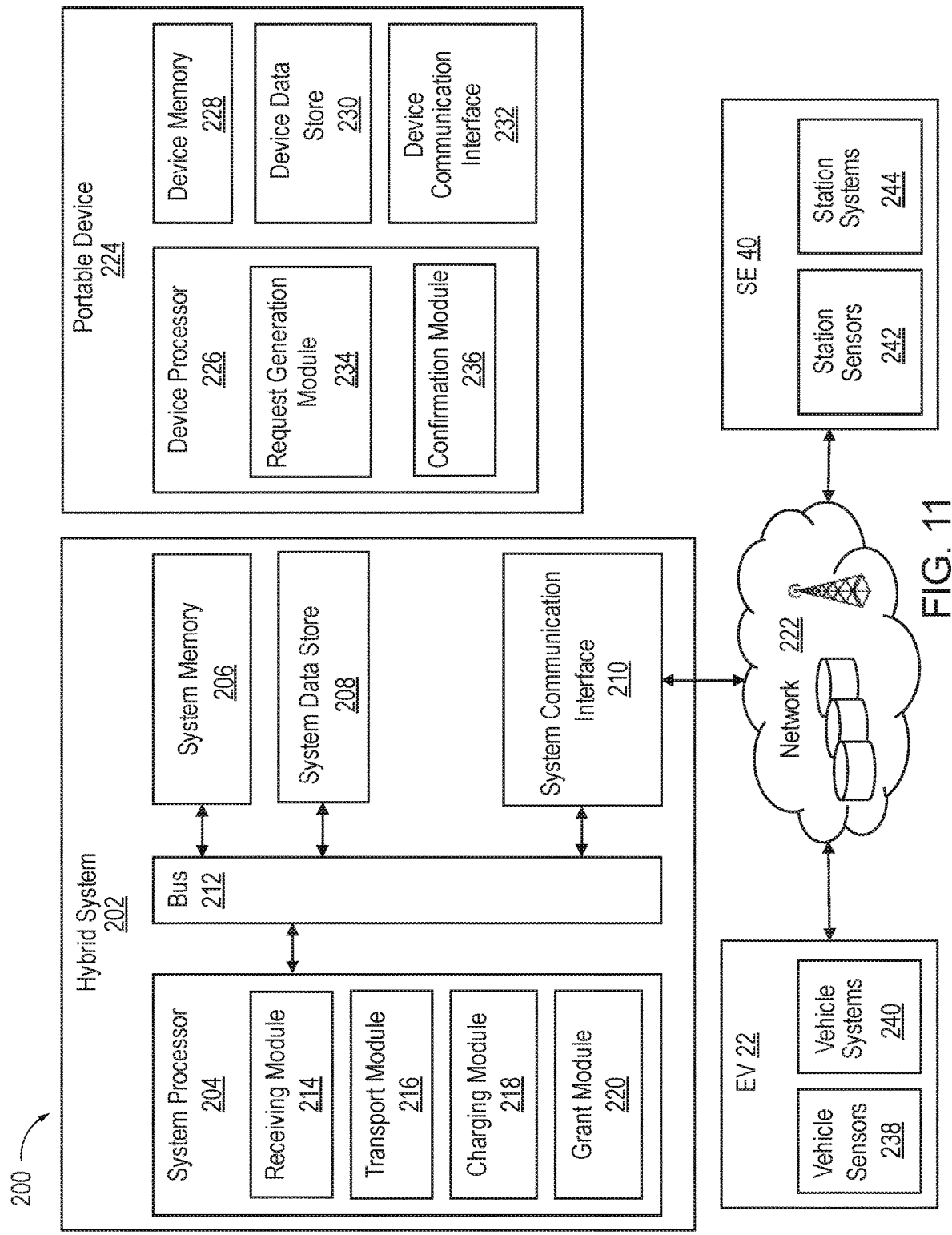
FIG. 11 is a block diagram of an operating environment for implementing a hybrid vehicle-to-grid and mobility service request system.

FIG. 11 is a block diagram of an operating environment for implementing a hybrid vehicle-to-grid and mobility service request system. The components of the operating environment 200, as well as the components of other systems, hardware architectures, and software architectures discussed herein, can be combined, omitted, or organized into different architectures for various embodiments. Some components of the operating environment 200 can be implemented with or associated with a mobile application, EV 22, the mobility service 26, the SE 40, a portable device 224, or other device connected via a network (e.g., a network 222).

Generally, the hybrid vehicle-to-grid and mobility service request system 202 includes a system processor 204, a system memory 206, a system data store 208, and a system communication interface 210, which are each operably connected for computer communication via a bus 212 and/or other wired and wireless technologies. The system communication interface 210 provides software and hardware to facilitate data input and output between the components of the hybrid vehicle-to-grid and mobility service request system 202 and other components, networks, and data sources, which will be described herein. Additionally, the system processor 204 includes a receiving module 214, a transport module 216, a charging module 218, and a grant module 220, each suitable for providing a hybrid vehicle-to-grid and mobility service request service facilitated by the components of the operating environment 200. The hybrid vehicle-to-grid and mobility service request system 202 is also operably connected for computer communication (e.g., via the bus 212 and/or the system communication interface 210).

The hybrid vehicle-to-grid and mobility service request system 202 is also operatively connected for computer communication to the network 222, EV 22, the SE 40, a portable device 224. The connection from the system communication interface 210 to the network 222, EV 22, the SE 40, and/or the portable device 224, can be facilitated in various ways. For example, through a network connection (e.g., wired or wireless), a cellular data network from the portable device 224, etc.

Similar to the network 28 discussed above with respect to FIG. 1, the network 222 is, for example, a data network, the Internet, a wide area network, a local area network, or cellular data network. The network 222 serves as a communication medium to various remote devices (e.g., databases, web servers, remote systems, application servers, intermediary servers, client machines, other portable devices). In some embodiments, EV 22, the SE 40, and/or the portable device 224 can be accessed by the hybrid vehicle-to-grid and mobility service request system 202 through the network 222, and/or the network 222 can access the EV 22, the SE 40, and/or the portable device 224. Thus, in some embodiments, the hybrid vehicle-to-grid and mobility service request system 202 can obtain data from the EV 22, the SE 40, and/or the portable device 224 via the network 222.

The hybrid vehicle-to-grid and mobility service request system 202 can transmit and receive information directly or indirectly to and from the EV 22, the SE 40, and/or the portable device 224 over the network 222. The portable device 224 can include a device processor 226, a device memory 228, device data store 230, and a device communication interface 232 that are configured to be in communication with one another. The device processor 226 includes a request generation module 234 and a confirmation module 236 each suitable for providing a mobility service facilitated by the components of the operating environment 200.

As discussed above, EV 22 can provide transport, for example, through ride-sharing, an autonomous vehicle taxi service, car rental, etc. for a potential passenger 42. In one embodiment, the request generation module 234 of the portable device 224 generates a request based on the potential passenger 42 input at the portable device 224. The potential passenger 42 may manually input one or more requests into the portable device 224 using an input device, such as a keypad, voice recognition, touch screen, etc. In some embodiments, the portable device 224 may run an application that allows the potential passenger 42 to interface with the request generation module 234. The application may be instructions in execution on the portable device 224, firmware, software in execution on the portable device 224, and/or combinations of each to perform a function(s) or an action(s), and/or to cause a function or action from another module, method, and/or system.

In some embodiments, the request may be made by the potential passenger 42 inputting information, such as logistical factors in a fillable form style or the information may be entered using voice recognition. The logistical factors may include, but are not limited to, at least a portion of the route, the origin, the destination, address, coordinates, point of interest, one or more roadway names, and a waypoint. The logistical factors also be an event, invitation, ticket, or other item associated with a time or location. For example, the logistical factors may include a time of arrival, appointment time, the time an event is scheduled to start, a time of departure, the duration of the outing, among others. In another example, the potential passenger 42 may speak vocally list one or more logistical factors and/or transportation features to a the portable device 224.

Once the request with one or more logistical factors is generated, the request generation module 234 transmits the request to the hybrid vehicle-to-grid and mobility service request system 202 using the network 222. The receiving module 214 identifies the one or more logistical factors from the request. For example, suppose the request was generated using a fillable form, the receiving module 214 may segment the fillable form to extract the one or more logistical factors. Likewise, the receiving module 214 may extract the one or more logistical factors from the other sources and/or devices connected via the network 222. For example, the receiving module 214 may access digital calendars, email etc. for logistical factors.

The receiving module 214 also receives a V2G energy request for the EV 22 to provide charge to SE 40, which may be infrastructure, another vehicle, charging station, building 34, etc. The V2G energy request may include one or more grid factors. The grid factors may include, but are not limited to, the available charge on the grid, the charge level of a particular charge point such as SE 40, traffic, geolocation, weather, etc. The grid factors may be historical, current, and/or predictive. For example, the charge level for the SE 40 may include a prediction of a weather-related reduction of the charge levels. The grid factors may be included in the request or accessible by the receiving module 214 in response to receiving the V2G energy request.

In one embodiment, the station systems 244 may generate a V2G request. The station systems 244 may generate the V2G request based on the station sensors 242. The station sensors 242 may monitor, track, and generate the grid factors. For example, the station sensors 242 may track the flow of charge on the grid and more particularly, to and from the SE 40. In some embodiments, the station systems 244 may provide one or more grid factors in the V2G energy request. The station systems 244 then transmit the V2G energy request to the hybrid vehicle-to-grid and mobility service request system 202. When the receiving module 214 receives the V2G energy request, the receiving module 214 may access the SE 40 to access the station sensors 242 and/or the station systems 244 to collect one or more grid factors.

In response to the receiving module 214 receiving multiple requests, such as a transport request and a V2G energy request, the receiving module 214 may determine the extent to which the requests overlap. For example, the receiving module 214 may calculate transport timing for transport based on the logistical factors associated with the transport request. The receiving module 214 may additionally calculate charge timing for providing charge to the SE 40. For example, the charge may be requested for a specified duration of time based on a predicted reduction of charge on the grid at a given time. Then, the receiving module 214 determines whether the transport timing and the charge timing at least partially overlap. In other examples, the overlap may be based on geography, amount of charge the EV 22 is required to have to satisfy the requests, etc. Due to the overlap, the EV 22 may not be able to satisfy each of the requests.

The transport module 216 uses the one or more logistical factors and/or the transport request to determine a first numerical value associated with remuneration for the transport. The first numerical value may be represented as a percentage, an integer, a non-numerical value, a discrete state, a discrete value, a continuous value, among others. The first numerical value is indicative of the value conferred to the operator of the EV for satisfying the transport request. For example, the first numerical value may represent the amount that the potential passenger 42 is willing to pay for transport or the amount the potential passenger 42 is willing to pay per mile. The remuneration may also account for the cost to the EV 22 for satisfying the transport request. For example, the first numerical value may be or include the cost associated with the energy expenditure incurred by the EV 22 for satisfying the transport request. In particular, the first numerical value may be based on proximity to the origin in the transport request, the current cost of fuel and/or power, as well as potential passenger loyalty. Accordingly, the first numerical value may include a cost benefit analysis associated with the remuneration for the transport.

The charging module 218 uses the one or more grid factors and/or the V2G energy request to determine a second numerical value associated with remuneration for providing the charge. Like the first numerical value, the second numerical value may be represented as a percentage, an integer, a non-numerical value, a discrete state, a discrete value, a continuous value, among others. The second numerical value is indicative of the value conferred to the operator of the EV for satisfying the V2G energy request. For example, the second numerical value may represent the amount received for providing a charge to the grid via the SE 40, such as the amount paid per kWh provided to the grid.

Also like the first numerical value, the second numerical value may incorporate the cost associated with satisfying the V2G energy request. The second numerical value may also be based on a grid prediction associated with charge levels at the charging location. In particular, the charging module 218 may predict the charge levels on the grid based on one or more grid factors including a weather-related reduction of the charge levels. For example, the grid prediction may be based on a charge station-to-electric vehicle ratio associated with the charge location for the SE. In one embodiment, the grid prediction may determine that the charge station-to-electric vehicle ratio is above a threshold and modify the second numerical value accordingly. Suppose the charge station-to-electric vehicle ratio being above the threshold is indicative of a drain on the supply. The second numerical value may be increased indicating a greater benefit would be conferred to the operator for providing the SE 40 with charge from the EV 22.

The grant module 220 compares the first numerical value associated with the transport request to the second numerical value associated with the V2G energy request. The comparison may determine which request of the transport request and the V2G energy request confers the greatest benefit to the operator of the EV 22. For example, the grant module 220 may determine a greater numerical value of the first numerical value and the second numerical value.

The grant module 220 the transport request or the V2G energy request based on the comparison. Continuing the example from above, the grant module 220 may grant the request associated with the greater numerical value. In addition to granting the request, the grant module 220 may initiate communication over the network 222. For example, the grant module 220 may transmit a response signal to a potential passenger 42 associated with a transport request. Suppose the potential passenger 42 generated the transport request using the request generation module 234. The grant module 220 may transmit the response signal such that the response signal is received by the confirmation module 236. The confirmation module 236 may notify the potential passenger 42 that the transport request was granted.

In another embodiment, the grant module may dispatch the EV 22 to the origin associated with the transport request or the charging location associated with the V2G energy request. Accordingly, the grant module 220 may generation a path plan for the EV 22 that facilitates the EV 22 navigating to a location associated with the grated request. For example, the grant module 220 may access the vehicle sensors 238 or the vehicle systems 240 to determine the current location of the EV 22 and store, calculate, and/or provide route and/or destination information and facilitate features like turn-by-turn direction for the EV 22 based on the granted request. Accordingly, the hybrid vehicle-to-grid and mobility service request system 202 manages the requests received for an EV 22 to facilitate maximizing the benefit that can be conferred to the EV 22. Therefore, the operator can use an EV or fleet of EVs to the greatest effect.

Figure 12:
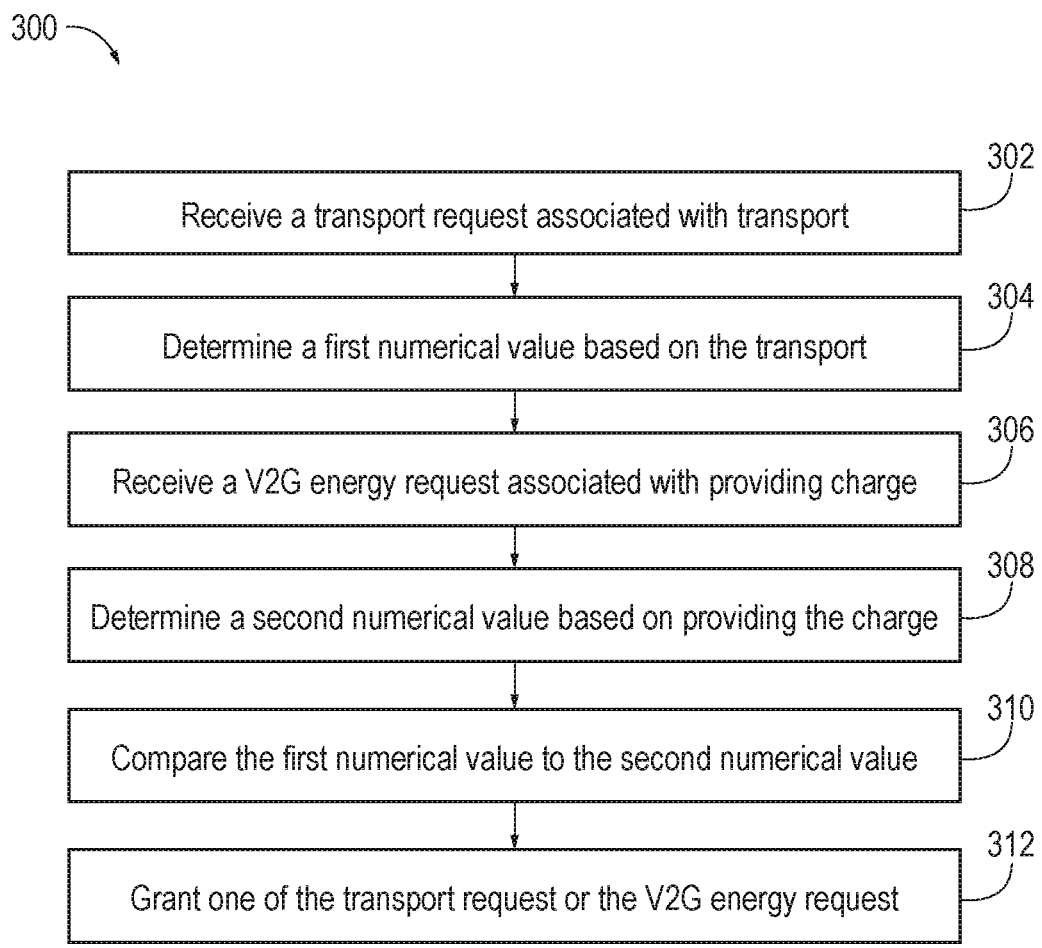
FIG. 12 is a process flow for providing a hybrid vehicle-to-grid and mobility service request according to one embodiment.

FIG. 12 is a process flow for providing a hybrid vehicle-to-grid and mobility service request according to one embodiment.

At block 302 the method 300 includes receiving a transport request associated with transport to a destination using a vehicle. The transport request is a proposal to receive transport for a potential passenger 42 or an item associated with the potential passenger 42 in return for a benefit being conferred to an operator associated with EV 22. The operator may be the owner, manager, vehicle occupant and/or entity associated with the EV 22.

At block 304, the method 300 includes determining a first numerical value associated with remuneration for the transport. The first numerical value quantifies the benefit that would be conferred to the operator if the transport request were to be granted.

At block 306, the method 300 includes receiving a V2G energy request associated with providing charge from the vehicle to source equipment at a charging location. The V2G energy request proposal to receive charge at a charging location in return for a benefit being conferred to the operator.

At block 308, the method 300 includes determining a second numerical value associated with remuneration for providing the charge. The second numerical value quantifies the benefit that would be conferred to the operator if the V2G energy request were to be granted.

At block 310, the method 300 includes comparing the first numerical value associated with the transport request to the second numerical value associated with the V2G energy request.

At block 312, the method 300 includes granting the transport request or the V2G energy request based on the comparison. For example, the request having a numerical value associated with the greatest benefit may be granted. Accordingly, the systems and methods described herein facilitate maximizing the benefits associated with mobility services and charging that can be provided by the EV 22.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A computing system, comprising:
   a receiving module configured to receive a transport request associated with transport from an origin to a destination using a vehicle and receive a V2G energy request associated with providing charge from the vehicle to source equipment at a charging location;
   a transport module configured to determine a first numerical value associated with remuneration for the transport;
   a charging module configured to determine a second numerical value associated with remuneration for providing the charge; and
   a grant module configured to:
      compare the first numerical value associated with the transport request to the second numerical value associated with the V2G energy request, and
      grant the transport request or the V2G energy request based on the comparison.

2. The computing system of claim 1, wherein when the transport request is granted, the grant module is further configured to generate a path plan that includes the destination, and when the V2G energy request is granted, the grant module is configured to generate a path plan that includes the charging location.

3. The computing system of claim 1, wherein the grant module is further configured to transmit a response signal to a potential passenger associated with the transport request.

4. The computing system of claim 1, wherein the vehicle is autonomous, and wherein the grant module is further configured to dispatch the vehicle to the origin or the charging location.

5. The computing system of claim 1, wherein the first numerical value is based on proximity to the origin.

6. The computing system of claim 1, wherein the second numerical value is based on a grid prediction associated with charge levels at the charging location.

7. The computing system of claim 6, wherein the grid prediction is based on one or more grid factors including weather-related reduction of the charge levels.

8. The computing system of claim 6, wherein the grid prediction is based on one or more grid factors including a charge station-to-electric vehicle ratio associated with the charge location is below a threshold.

9. The computing system of claim 1, wherein the comparison includes the grant module determining a greater numerical value of the first numerical value and the second numerical value, and wherein the grant module grants a request associated with the greater numerical value.

10. The computing system of claim 1, wherein the receiving module is further configured to:
    calculate transport timing for transport to the destination;
    calculate charge timing for providing charge to the source equipment; and
    determine that the transport timing and the charge timing at least partially overlap.

11. A method, comprising:
    receiving a transport request associated with transport to a destination using a vehicle;
    determining a first numerical value associated with remuneration for the transport;
    receiving a V2G energy request associated with providing charge from the vehicle to source equipment at a charging location;
    determining a second numerical value associated with remuneration for providing the charge;
    comparing the first numerical value associated with the transport request to the second numerical value associated with the V2G energy request; and
    granting the transport request or the V2G energy request based on the comparison.

12. The method of claim 11, wherein granting the transport request includes generating a path plan that includes the destination, and wherein granting the V2G energy request includes generating a path plan that includes the charging location.

13. The method of claim 11, wherein granting the transport request includes transmitting a grant signal to a potential passenger associated with the transport request.

14. The method of claim 11, wherein the second numerical value is based on a grid prediction associated with charge levels at the charging location.

15. The method of claim 14, wherein the grid prediction is based on one or more grid factors including weather-related reduction of the charge levels.

16. A non-transitory computer-readable storage medium including instructions that when executed by a processor, cause the processor to:
    receiving a transport request associated with transport to a destination using a vehicle;

determining a first numerical value associated with remuneration for the transport;

receiving a V2G energy request associated with providing charge from the vehicle to source equipment at a charging location;

determining a second numerical value associated with remuneration for providing the charge;

comparing the first numerical value associated with the transport request to the second numerical value associated with the V2G energy request; and granting the transport request or the V2G energy request based on the comparison.

17. The non-transitory computer-readable storage medium of claim 16, wherein granting the transport request includes generating a path plan that includes the destination, and wherein granting the V2G energy request includes generating a path plan that includes the charging location.

18. The non-transitory computer-readable storage medium of claim 16, wherein granting the transport request includes transmitting a grant signal to a potential passenger associated with the transport request.

19. The non-transitory computer-readable storage medium of claim 16, wherein the second numerical value is based on a grid prediction associated with charge levels at the charging location.

20. The non-transitory computer-readable storage medium of claim 19, wherein the grid prediction is based on one or more grid factors including weather-related reduction of the charge levels.

* * * * *